(12) United States Patent
Iijima

(10) Patent No.: US 9,200,576 B2
(45) Date of Patent: Dec. 1, 2015

(54) VEHICLE CONTROL DEVICE

(71) Applicant: NISSAN MOTOR CO., LTD., Yokohama-shi, Kanagawa (JP)

(72) Inventor: Kazuki Iijima, Tokyo (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/396,179

(22) PCT Filed: Mar. 12, 2013

(86) PCT No.: PCT/JP2013/056843
§ 371 (c)(1),
(2) Date: Oct. 22, 2014

(87) PCT Pub. No.: WO2013/161413
PCT Pub. Date: Oct. 31, 2013

(65) Prior Publication Data
US 2015/0088405 A1    Mar. 26, 2015

(30) Foreign Application Priority Data

Apr. 27, 2012   (JP) ................................. 2012-101942

(51) Int. Cl.
F02N 11/08   (2006.01)
F02D 29/02   (2006.01)
B60K 6/48    (2007.10)
B60W 10/06   (2006.01)
(Continued)

(52) U.S. Cl.
CPC . *F02D 29/02* (2013.01); *B60K 6/48* (2013.01); *B60W 10/06* (2013.01); *B60W 20/50* (2013.01); *B60W 30/18018* (2013.01); *F02D 41/1495* (2013.01); *F02N 11/0829* (2013.01); *B60W 2510/0619* (2013.01); *F02D 41/1454* (2013.01); *F02D 41/22* (2013.01); *F02D 2700/07* (2013.01); *F02N 11/0822* (2013.01); *F02N 2200/0801* (2013.01); *F02N 2200/102* (2013.01); *Y02T 10/48* (2013.01); *Y02T 10/6221* (2013.01)

(58) Field of Classification Search
CPC ............ F02N 11/0818; F02N 11/0822; F02N 11/0829; F02N 11/0833; F02N 11/0837; F02N 11/084
USPC ........................................ 701/112; 123/179.4
See application file for complete search history.

(56) References Cited

U.S. PATENT DOCUMENTS 6,504,259 B1 *  1/2003  Kuroda et al. .............. 290/40 C
6,532,926 B1 *  3/2003  Kuroda et al. .............. 123/179.4
(Continued)

FOREIGN PATENT DOCUMENTS

JP    2008-151041 A    7/2008
JP    2010-179712 A    8/2010
(Continued)

*Primary Examiner* — Erick Solis
(74) *Attorney, Agent, or Firm* — Foley & Lardner LLP

(57) ABSTRACT

A control device for a vehicle configured to automatically stop an engine while the vehicle is running, the control device includes: an engine stop request outputted in accordance with an operation of a driver, and an engine stop prohibition request outputted based on a driving state of the vehicle which are independent requests, the higher-priority engine stop request being preferentially performed when both the requests are simultaneously outputted, and the engine stop prohibition request being withdrawn when the engine stop is performed by the higher-priority engine stop request.

4 Claims, 5 Drawing Sheets

(51) Int. Cl.
*B60W 20/00* (2006.01)
*B60W 30/18* (2012.01)
*F02D 41/14* (2006.01)
*F02D 41/22* (2006.01)

(56) References Cited

U.S. PATENT DOCUMENTS

| | | | |
|---|---|---|---|
| 8,142,331 B2* | 3/2012 | Burdeti | 477/111 |
| 8,606,485 B1 | 12/2013 | Ando | |
| 8,831,809 B2* | 9/2014 | Wang et al. | 701/22 |
| 2011/0180031 A1 | 7/2011 | Hamane | |
| 2012/0077640 A1 | 3/2012 | Saito et al. | |
| 2012/0283935 A1* | 11/2012 | Gregori et al. | 701/112 |
| 2014/0315684 A1* | 10/2014 | Bureau et al. | 477/107 |

FOREIGN PATENT DOCUMENTS

| | | |
|---|---|---|
| JP | 2011-001859 A | 1/2011 |
| JP | 2011-153559 A | 8/2011 |
| JP | 2011-219026 A | 11/2011 |
| WO | 2012-039029 A1 | 3/2012 |

\* cited by examiner

VEHICLE CONTROL DEVICE

TECHNICAL FIELD

This invention relates to a control device for a vehicle which is configured to automatically stop an engine.

BACKGROUND ART

In a hybrid vehicle which uses both an engine and a motor as a driving source of the vehicle, an idling stop to automatically stop the engine is performed even when the vehicle is driving, for purification of an exhaust air and an improvement of a fuel economy at a temporal stop of the vehicle such as a stop for a traffic light (cf. for example, patent document 1).

PRIOR ART DOCUMENT

Patent Document

Patent Document 1: Japanese Patent Application Publication No. 2010-179712

SUMMARY OF THE INVENTION

Problems Which the Invention is Intended to Solve

In this way, in the control device of the vehicle which is configured to automatically stop the engine while the vehicle is running, an engine stop request for stopping the engine, and an engine stop prohibition request for prohibiting the engine stop are independently set and outputted as respective independent requests. For example, the engine stop request is outputted at the sudden deceleration by the operation of the brake by the driver. The engine stop prohibition request is outputted for performing a failure diagnosis of an air-fuel ratio sensor which is performed during the operation of the engine.

When these conflicting engine stop request and engine stop prohibition request are simultaneously outputted, one of the both requests is preferentially performed in accordance with the predetermined priority. In this case, when the engine stop request according to the operation of the driver has priority over the engine stop prohibition request which is not dependent on the operation of the driver, following problems are caused.

That is, in a case where the engine stop request has the priority and the engine stop is performed in the state where the both requests are outputted, when this engine stop request is released, the engine stop prohibition request which is not effective for the lower priority while the engine stop request is outputted becomes in effective. By this engine stop prohibition request, the engine stop is prohibited, and the engine is restarted. That is, the unexpected restart of the engine which is not dependent on the operation of the driver may be generated to provide the unnatural feeling to the driver.

Means For Solving the Problem

The present invention is attained in consideration of the above-described matter. That is, in the present invention, in a control device for a vehicle arranged to automatically stop an engine, an engine stop request outputted in accordance with an operation of a driver, and an engine stop prohibition request outputted based on a driving state of a vehicle are independently set and outputted as respective independent requests. When both the requests are simultaneously outputted, the higher-priority engine stop request is preferentially performed. Then, when the engine stop is performed by the higher-priority engine stop request, the engine stop prohibition request which is the other request is canceled, and this engine stop prohibition request is forcibly withdrawn.

Benefit of The Invention

By the present invention, in a case where the engine stop request has the priority and the engine stop is performed, the engine stop prohibition request is withdrawn. When the engine stop request having the priority is released, the restart of the engine is not immediately performed by the engine stop prohibition request. That is, it is possible to avoid generating the unexpected restart of the engine which is not dependent on the operation of the driver. Accordingly, the unnatural feeling is not provided to the driver. Moreover, it is possible to suppress the deterioration of the emission and the decrease of the fuel economy due to the unexpected restart of the engine.

DESCRIPTION OF EMBODIMENTS

Figure 1:
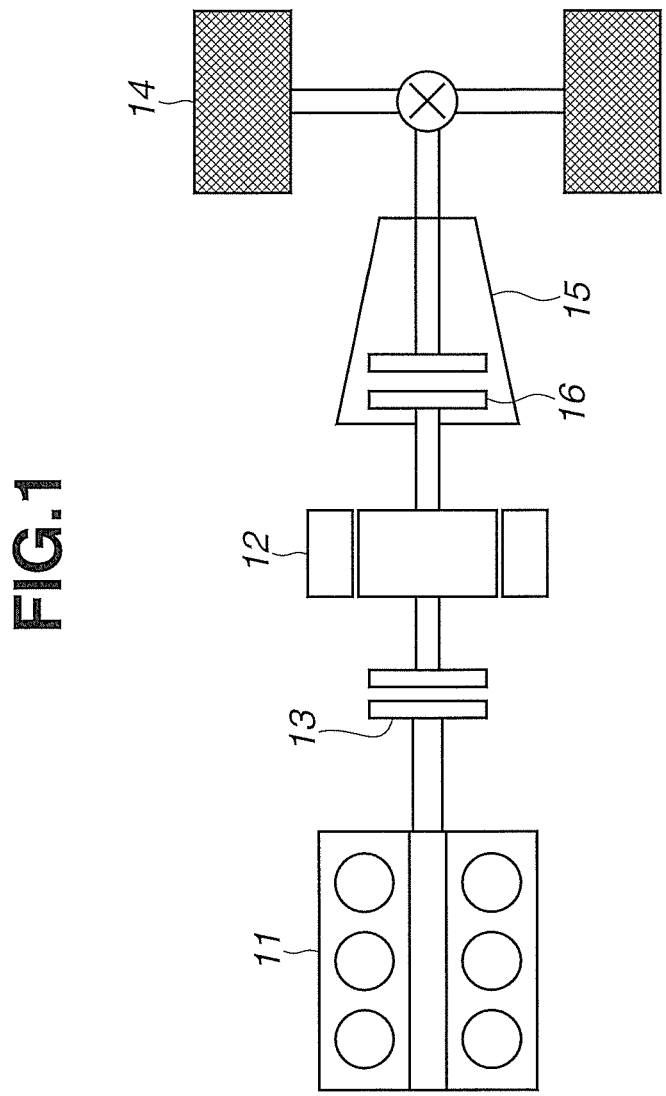
FIG. 1 is a configuration view showing a hybrid vehicle to which a control device according to one embodiment of the present invention is applied.

Hereinafter, the present invention is illustrated by embodiments shown by the drawings. FIG. 1 schematically shows a hybrid vehicle to which a control device according to one embodiment of the present invention is applied. This vehicle is a one motor and two clutch type hybrid vehicle. This vehicle combinendly uses an engine 11 and a motor 12 as a vehicle driving sources. The engine 11 is a spark-ignition gasoline engine, a compression self-ignition diesel engine, or so on which is arranged to generate a driving force by combustion of fuel. The motor 12 is a motor generator arranged to generate a driving force from an electric power from a battery (not shown), to function as a generator to regenerate the power, and thereby to charge the battery. A first clutch 13 is disposed between the engine 11 and the motor 12. An automatic transmission 15 and a second clutch 16 are disposed between the motor 12 and driving wheels 14. The first clutch 13 is arranged to switch a connection and a disconnection of a power transmission between the engine 11 and the motor 12. The first clutch 13 is arranged to be connected in case of using the driving force of the engine 11, and to be disengaged, for example, when the vehicle runs only by the motor 12. The second clutch 16 is arranged to switch a connection and a disconnection of a power transmission between the motor 12 and the driving wheels 14. The clutch 16 is arranged to be connected when the vehicle runs, and to be disengaged when a shift range is in an N range or a P range. In this embodiment, the second clutch 16 is constituted by using a frictional engagement element within the automatic transmission 15. With this, the configuration is simplified. However, the second clutch 16 may be provided, as a member different from the automatic transmission 15, on front or rear side of the automatic transmission 15.

Figure 2:
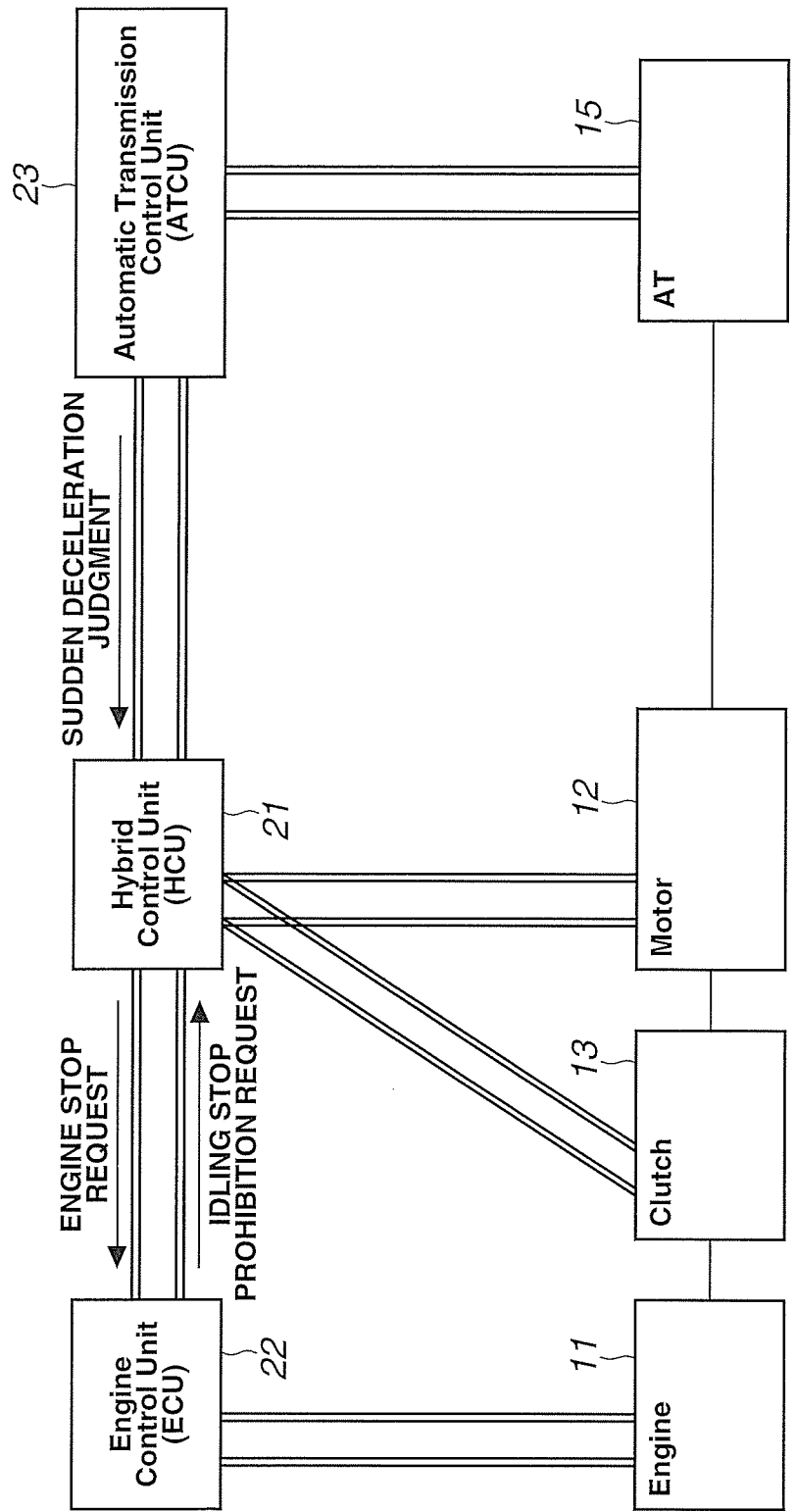
FIG. 2 is a configuration view showing a control device of the hybrid vehicle.

FIG. 2 schematically shows a control device of this hybrid vehicle. In this control device, a plurality of control units 21-23 are connected with each other by bidirectional communication system such as a CAN communication system. The control units 21-23 are arranged to store and perform various control operations. The engine control unit 22 is configured to perform an engine control of an ignition timing control, a fuel injection timing control, and so on of the engine 11. The transmission control unit 23 is configured to perform a shift control of the automatic transmission 15, a switching control of the connection and disengagement of the second clutch 16 installed in this automatic transmission 15. The hybrid control unit 21 is configured to output control signals to the first clutch 13 and the motor 12, and the above-described control units 22 and 23 based on a vehicle driving state, and to integrally control the operation of the vehicle. Besides, in this embodiment, the hybrid control unit 21 directly controls the first clutch 13 and the motor 12. However, a special controller may be provided similarly to the engine 11 and the automatic transmission 15.

Figure 3:
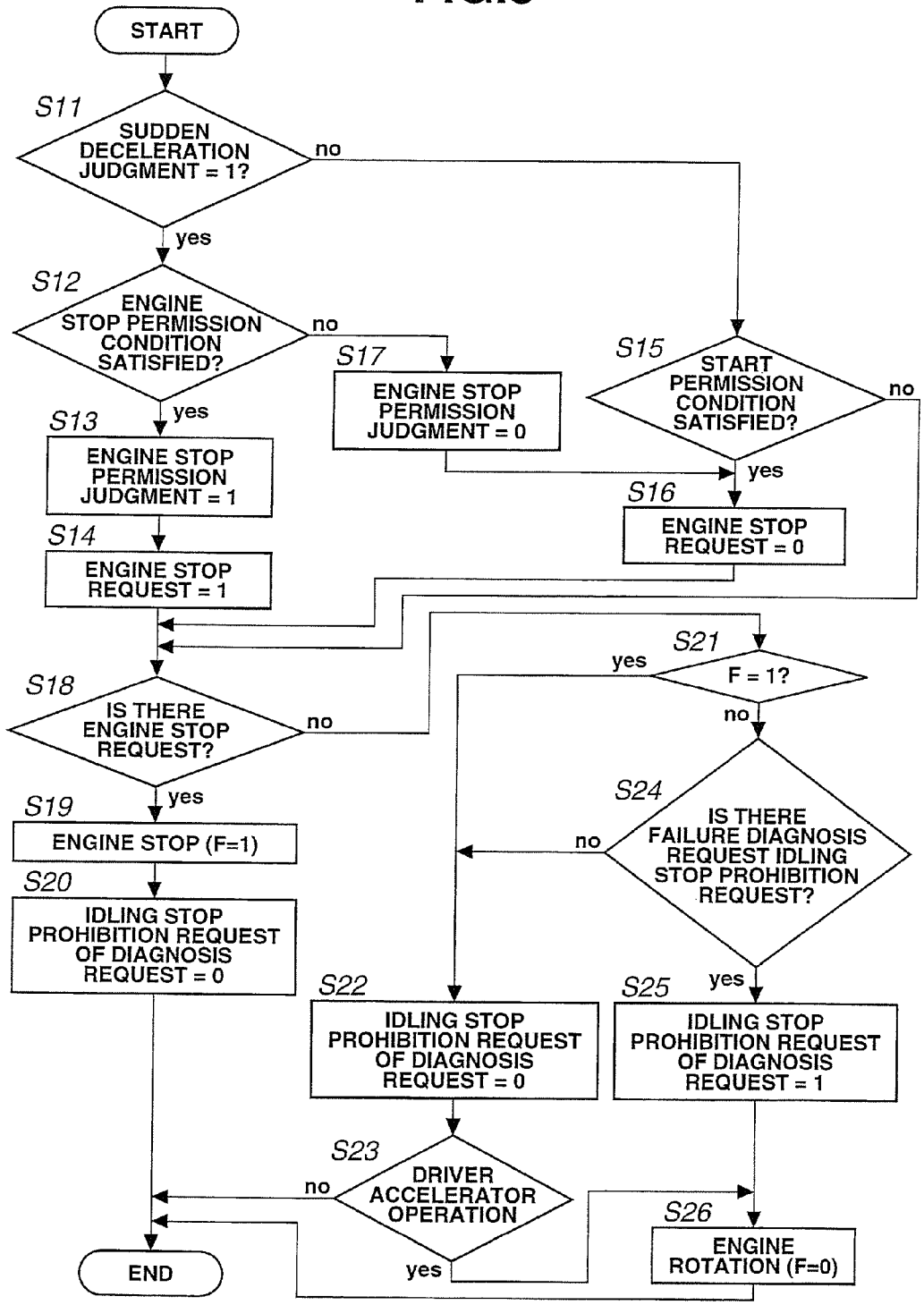
FIG. 3 is a flowchart showing a flow of a control according to the embodiment.

FIG. 3 is a flowchart showing a flow of the control which is a main part of the present embodiment. This routine is repeated by the control device of FIG. 2 at each predetermined time period (for example, at each 10 ms). Besides, steps S11-S17 show operations performed by the hybrid control unit 21. Steps S18-S26 show operations performed by the engine control unit 22.

At step S11, it is judged whether or not the sudden deceleration is judged, that is, whether or not a sudden deceleration judgment flag is "1" indicative of the sudden deceleration. This sudden deceleration judgment flag is set by the transmission control unit 23. For example, the sudden deceleration judgment flag is set to "1" when the driver depresses the brake pedal, and the deceleration (a decreasing amount of the vehicle speed or a variation amount of that) according to this brake operation is equal to or greater than a predetermined value.

When the sudden deceleration is judged, the process proceeds from step S11 to step S12. It is judged whether or not a predetermined engine stop permission condition is satisfied. In particular, it is judged whether or not the vehicle speed, the engine temperature, the charge amount of the battery and so on are within predetermined conditions to be capable of stopping the engine. When it is judged that the engine stop permission condition is satisfied, the process proceeds to step S13. The flag of the engine stop permission condition judgment is set to "1" representing that the engine stop permission condition is satisfied.

At next step S14, an engine stop request flag according to the driver's operation is set to "1" representing that there is this engine stop request. This is outputted from the hybrid control unit 21 to the engine control unit 22. More specifically, this engine stop request is an idling stop request for performing the idling stop by stopping the engine at the sudden deceleration with the disengagement of the first clutch 11. Besides, in this embodiment, when the engine stop permission condition is satisfied, the engine stop request (the engine stop request flag=1) is simply outputted. However, when a plurality of conditions including the satisfaction of the engine stop permission condition are satisfied, the engine stop request may be outputted.

At the above-described step S11, when the sudden deceleration judgment flag is not "1", that is, when the sudden deceleration does not occur, the process proceeds to step S15.

It is judged whether or not a start permission condition of the engine 11 is satisfied. That is, it is judged whether or not the vehicle speed, the engine temperature, the charge amount of the battery, and so on are within the predetermined conditions to be capable of starting the engine 11. For example, when the vehicle is in the stop state in which the vehicle speed is substantially zero, and the brake switch is in the ON state, that is, the brake pedal is depressed, it is judged that the start permission condition is satisfied since the engine can be stably started without causing the unexpected start/movement of the vehicle.

When the start permission condition is satisfied, the process proceeds from step S15 to step S16. The judgment flag of the engine stop request is set to "0" representing that there is no engine stop request. That is, the engine stop request is released under the condition of the satisfaction of the start permission condition.

When the engine stop permission condition is not satisfied at the above-described step S12, the process proceeds to step S17. The engine stop permission judgment flag is set to "0" representing that the engine stop permission condition is not satisfied. The process proceeds to step S16. The judgment flag of the engine stop request is set to "0" representing that there is no engine stop request.

The result of the judgment flag of the engine stop request which is set at the above-described step S14 or step S16 is outputted through the CAN communication system from the hybrid control unit 21 to the engine control unit 22.

At step S18, the engine control unit 22 judges whether or not there is the engine stop request (the idling stop request), that is, whether or not the judgment flag is "1", based on the judgment flag of the engine stop request outputted from the hybrid control unit 21. When there is the engine stop request, the process proceeds to step S19. The automatic stop of the engine, that is, the idling stop is performed. A flag F is set to "1" representing the engine stop state.

At step S20, the flag of the idling stop prohibition request which is representing the engine stop prohibition request set based on the vehicle driving state is set to "0" representing that there is no idling stop prohibition request. The idling stop prohibition request is withdrawn (dismissed). This idling stop prohibition request is for an operation performed when the engine is operating, for example, like a failure diagnosis of an air-fuel ratio sensor provided to an exhaust system of the engine.

In this case, the engine stop request according to the brake operation of the driver, and the idling stop prohibition request which is not dependent on the operation of the driver, and which is for the failure diagnosis performed based on the vehicle driving state, and so on are independent different requests. These are independently calculated and set. Accordingly, the engine stop request and the idling stop prohibition request which are the conflicting requests may be simultaneously outputted. In this case, one of these is preferentially performed in accordance with the priority order. In this embodiment, it is set that the engine stop request according to the operation of the driver is performed in priority to the idling stop prohibition request, so as not to provide the unnatural feeling to the driver, and so as to purify the emission, and to improve the fuel consumption, and so on.

In this embodiment, when the engine stop request has the priority and the engine stop is performed in this way, at step S20, the idling stop prohibition request which is the other request is forcibly released, this idling stop prohibition request is withdrawn.

When there is no engine stop request at the above-described step S18, the process proceeds to step S21. It is judged whether or not the flag F is "1" representing the engine stop state. When the flag F is "1", that is, when it is in the engine stop state, the process proceeds to step S22. The flag of the idling stop prohibition request for the diagnosis request is set to "0" representing that there is no idling stop prohibition request.

At next step S23, it is judged whether or not there is the restart request of the engine by the depression operation of the accelerator pedal by the driver. When there is the restart request of the engine according to the accelerator operation of the driver, the process proceeds to step S26. The restart (the cranking) of the engine is performed. The flag F is set to "0" representing that it is not in the engine stop state. On the other hand, when there is no restart request of the engine according to the accelerator operation of the driver, the restart of the engine is not performed. This routine is finished.

When the flag F is not "1" representing the engine stop state, that is, when the engine is operated at the above-described step S21, the process proceeds to step S24. It is judged whether or not there is the idling stop prohibition request for the failure diagnosis. When there is the idling stop prohibition request, the process proceeds to step S25. The flag of the idling stop prohibition request for the failure diagnosis is set to "1" representing that there is the idling stop prohibition request. The process proceeds to the above-described step S26. The restart of the engine is performed.

On the other hand, when there is no idling stop prohibition request for the failure diagnosis at step S24, the process proceeds to the above-described step S22. The flag of the idling stop prohibition request for the failure diagnosis is set to "0" representing that there is no idling stop prohibition request. Then, at the above-described step S23, it is judged whether or not there is the restart request of the engine according to the accelerator operation of the driver. When there is the restart request of the engine, the engine is restarted at step S26.

Figure 4:
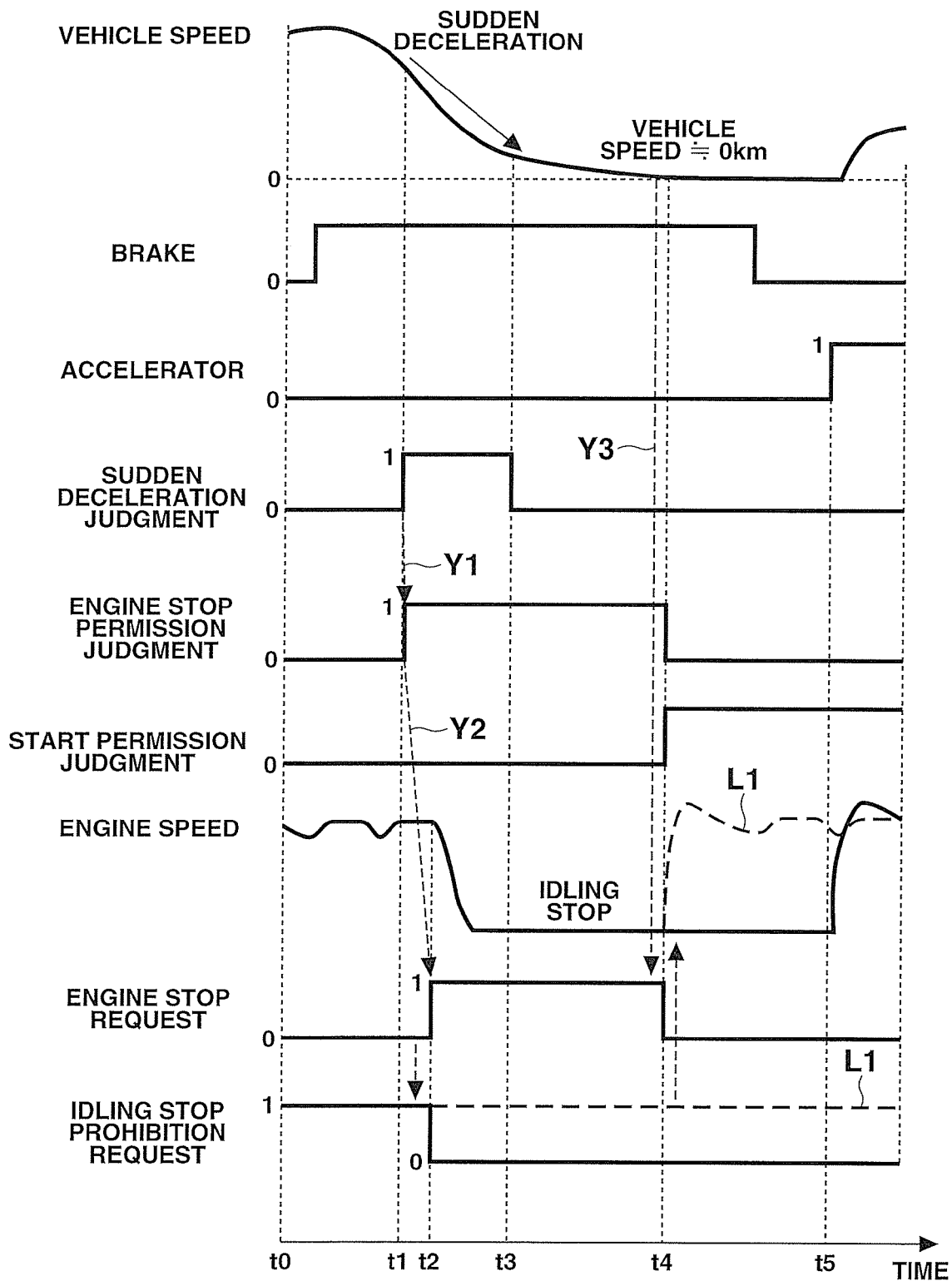
FIG. 4 is a timing chart showing a variation of various flags and so on in case of applying the embodiment.

FIG. 4 shows a timing chart when this control according to this embodiment is applied. When the vehicle speed is lowered by the depression of the brake pedal by the driver, at time t1, the sudden deceleration is judged and the flag for the sudden deceleration is set to "1". Subsequently, it is judged whether or not the engine stop permission condition is satisfied (cf. an arrow Y1). When the engine stop permission condition is satisfied, the engine stop request (the flag=1) is outputted from the hybrid control unit 21 to the engine control unit 22 (at time t2), as shown by an arrow Y2. The automatic stop of the engine 11 is performed, and the engine speed is suddenly lowered toward zero.

Then, the sudden deceleration judgment is released at time t3. At time t4, the vehicle speed is decreased to substantially zero, that is, the vehicle becomes the stop state. Moreover, when the brake switch is in the ON state, that is, the brake is depressed, it is judged that the above-described start permission condition is satisfied. The flag of the start permission judgment is set to "1". Under the condition that the start permission condition is satisfied in this way, the flag for the engine stop permission judgment is set to "0", and the engine stop permission is released. With this, the flag of the engine stop request judgment is set to "0". The engine stop request is released (cf. an arrow Y3).

At the time t2 at which the above-described engine stop request is outputted, the flag of the idling stop prohibition request for the failure diagnosis which is set in accordance with the vehicle driving state is "1". That is, the idling stop prohibition request is also outputted. That is, both the engine stop request (the idling stop request) and the idling stop prohibition request which are conflicting to each other are independently outputted. As described above, when the both requests exist simultaneously, the engine stop request according to the driver's operation has a priority to the idling stop prohibition request for the failure diagnosis which is not dependent on the driver's operation. Accordingly, when the engine stop request is received, the automatic stop of the engine (the idling stop) is performed, irrespective of the existence of the idling stop prohibition request.

In general, even when the engine stop (the idling stop) is performed in accordance with the engine stop request, the setting of the idling stop prohibition request is held without change, like a comparative example shown by characteristics of a broken line L1 of the drawing. That is, the idling stop prohibition request is continued to be outputted. In this comparative example, at time t4 at which the engine stop request is canceled, the engine is restarted by the idling stop prohibition request which is not canceled to be remained. The unexpected restart of the engine which is not dependent on the operation of the driver is generated, so that the unnatural feeling may be provided to the driver.

Contrary to this, in the present embodiment, at time t2 at which the engine stop is preferentially performed in accordance with the engine stop request, the flag of the idling stop prohibition request which is the other independent request is set to "0" representing that there is no idling stop prohibition request. That is, the idling stop prohibition request is withdrawn. Accordingly, even when the high-priority engine stop request is released (time t4), the restart of the engine is not unexpectedly performed since the idling stop prohibition request is already withdrawn. That is, it is possible to avoid causing the unexpected restart of the engine which is not dependent on the request of the driver, and to avoid providing the unnatural feeling to the driver. Then, when the engine start request is generated by the operation of the accelerator by the driver (time t5), the restart of the engine is automatically performed in accordance with this engine start request.

Moreover, in the present embodiment, the engine stop request which is an object to withdraw the idling stop prohibition request is specified to the idling stop request at the sudden deceleration with the brake operation of the driver. Accordingly, it is possible to obtain following effects and operations.

The first clutch 13 is disposed between the engine 11 and the motor 12 in the hybrid vehicle. The first clutch 13 has frequency characteristics of capable of effectively absorbing the vibration with respect to the engine speed mainly at the normal running. Accordingly, it is not possible to sufficiently absorb the variation of the engine speed in the low speed region such as the sudden deceleration. If the sudden deceleration is performed while the first clutch 13 is maintained to be connected, the vibration may be transmitted from the shaft to the driving wheels 14, so that the shock and the unnatural feeling may be provided to the driver. Accordingly, at the sudden deceleration, it is necessary to perform the engine stop, that is, the idling stop by disengaging the first clutch 13. Consequently, as described above, the idling stop request which is the engine stop request at the sudden deceleration is performed in priority to the idling stop prohibition request.

However, the judgment of the sudden deceleration is performed in accordance with the deceleration of the vehicle, as described above. That is, when the deceleration is equal to or greater than the predetermined value, the sudden deceleration is judged. However, at the sudden deceleration, the deceleration is also decreased during a relatively short time period in accordance with the sudden decrease of the vehicle speed. Accordingly, the idling stop request at the sudden deceleration is a request which is released during the relatively short time period. Consequently, in a case where the idling stop prohibition request is not withdrawn like the above-described comparative example when the idling stop is preferentially performed by the idling stop request in a state where the idling stop request and the idling stop prohibition request are simultaneously outputted, the idling stop prohibition request may be remained without being canceled when the idling stop request is canceled. The frequency of generating the unexpected restart of the engine becomes high by this idling stop prohibition request. In this embodiment, it is possible to avoid this frequent unexpected restart of the engine.

Figure 5:
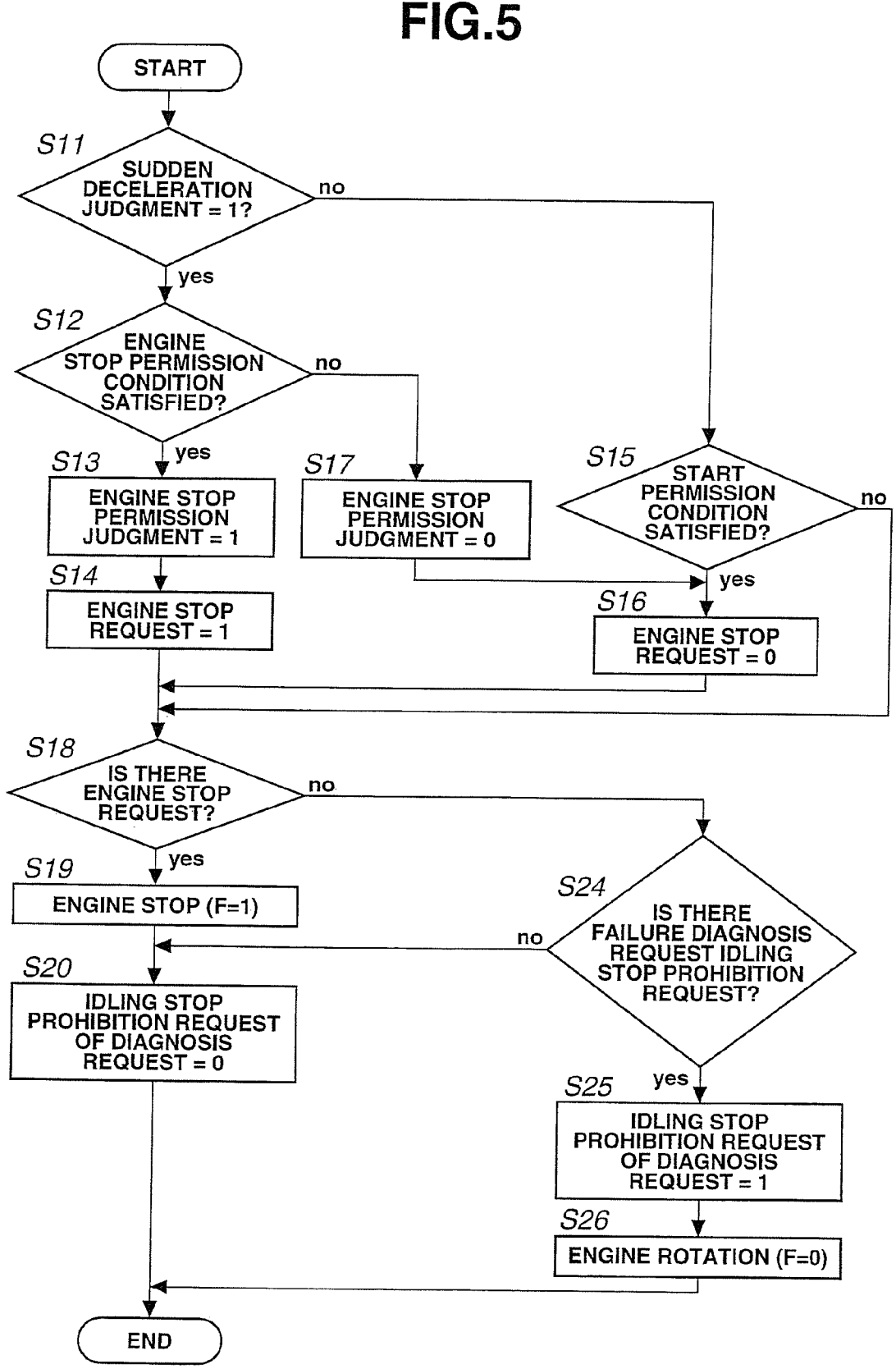
FIG. 5 is a flowchart showing a flow of a control according to another embodiment of the present invention.

FIG. 5 shows another embodiment according to the present invention. In this embodiment, the operations of steps S21 to S23 of FIG. 3, that is, the operations relating to the restart of the engine according to the accelerator operation of the driver are omitted. In this case, when the engine stop is preferentially performed in accordance with the engine stop request, the idling stop prohibition request which is the another request is withdrawn. Accordingly, the restart of the engine is not unexpectedly performed by the idling stop prohibition request at the release of the engine stop request. Besides, in case of this embodiment, the restart of the engine from the idling stop is performed in accordance with the engine restart request performed by other routine (not shown).

Besides, in the above-described embodiment, the present invention is applied to the hybrid vehicle. However, the present invention is also applicable to a vehicle which has only an engine as the driving source as long as it is a vehicle arranged to perform an automatic stop and automatic restart of the engine. Moreover, in the above-described embodiment, the present invention is applied to the control of the idling stop. However, the present invention is also applicable, for example, to a control of an automatic stop of the engine during the running of the vehicle, other than the idling stop.

The invention claimed is:

1. A control device for a vehicle configured to automatically stop an engine while the vehicle is running, the control device comprising:
   an engine stop request outputted in accordance with an operation of a brake of a driver for automatically stopping the engine, and an engine stop prohibition request outputted based on a driving state of the vehicle which are independent requests,
   the higher-priority engine stop request being preferentially performed when both the requests are simultaneously outputted, and
   the engine stop prohibition request being withdrawn when the engine stop is performed by the higher-priority engine stop request.

2. The control device for the vehicle as claimed in claim 1, wherein the engine stop request is an idling stop request to temporarily stop the engine during the stop of the vehicle; and the engine stop prohibition request is an idling stop prohibition request to perform a failure diagnosis during the operation of the engine.

3. The control device for the vehicle as claimed in claim 1, wherein the vehicle is a hybrid vehicle which combinedly uses the engine and a motor as a driving source of the vehicle; and the engine stop request is outputted at a judgment of a sudden deceleration of the vehicle to stop the engine by disengaging a clutch disposed between the engine and the motor.

4. The control device for the vehicle as claimed in claim 1, wherein in a case where an engine restart request which is a request different from this engine stop request is outputted when the engine stop is performed in accordance with the engine stop request, a restart of the engine is performed.

* * * * *